United States Patent
Loume et al.

(10) Patent No.: US 11,005,261 B2
(45) Date of Patent: May 11, 2021

(54) METHOD FOR CONTROLLING AN INSTALLATION ALLOWING DC CURRENT TO BE TRANSMITTED IN A NETWORK WHILE PROTECTING SAID NETWORK FROM A SHORT CIRCUIT FAULT

(71) Applicants: Supergrid Institute, Villeurbanne (FR); Université Grenoble Alpes, Saint Martin-d'Heres (FR)

(72) Inventors: Dieynaba Loume, Villeurbanne (FR); Alberto Bertinato, Lyons (FR); Bertrand Raison, Saint Martin d'Heres (FR)

(73) Assignees: Supergrid Institute, Villeurbanne (FR); Universite Grenoble Alpes, Saint Martin-d'Heres (FR)

( * ) Notice: Subject to any disclaimer, the term of this patent is extended or adjusted under 35 U.S.C. 154(b) by 175 days.

(21) Appl. No.: 16/330,019

(22) PCT Filed: Aug. 30, 2017

(86) PCT No.: PCT/FR2017/052306
§ 371 (c)(1),
(2) Date: Mar. 1, 2019

(87) PCT Pub. No.: WO2018/042126
PCT Pub. Date: Mar. 8, 2018

(65) Prior Publication Data
US 2019/0199089 A1   Jun. 27, 2019

(30) Foreign Application Priority Data

Sep. 2, 2016 (FR) ...................................... 1658165

(51) Int. Cl.
*H02H 7/26*   (2006.01)
*H02H 3/30*   (2006.01)
(Continued)

(52) U.S. Cl.
CPC ............ *H02H 7/26* (2013.01); *H02H 1/0007* (2013.01); *H02H 3/305* (2013.01); *H02H 7/122* (2013.01);
(Continued)

(58) Field of Classification Search
USPC ....................................................... 361/62–69
See application file for complete search history.

(56) References Cited

U.S. PATENT DOCUMENTS

| | | | | |
|---|---|---|---|---|
| 2013/0106184 | A1* | 5/2013 | Hafner | H02H 7/268 307/29 |
| 2015/0116876 | A1* | 4/2015 | Whitehouse | H02H 7/268 361/66 |

FOREIGN PATENT DOCUMENTS

| | | |
|---|---|---|
| CN | 104767188 A | 7/2015 |
| CN | 104993472 A | 10/2015 |

(Continued)

OTHER PUBLICATIONS

Barker, C.D. et al., "An alternative approach to HVDC grid protection," in AC and DC Power Transmission, 10th IET International Conference on, pp. 1-6, Dec. 4-5, 2012.

L. Tang, "Control and protection of multi-terminal dc transmission systems based on voltage-source converters," Ph.D. dissertation, McGill University, Montreal, QC, CA, 2003.

*Primary Examiner* — Danny Nguyen
(74) *Attorney, Agent, or Firm* — Gable Gotwals

(57) ABSTRACT

A control method allows the control of an installation for transmitting electricity comprising a DC transmission network including a group of electricity transmission lines that are linked to one another. The method allows the opening of at least one N-1 safety system, for each safety system being opened, the contribution to the flow of current through the group of transmission lines, originating from the converter station associated with the safety system that is opened, is removed. Furthermore, the method also allows a search for the short-circuit fault in order to identify the faulty trans- (Continued)

mission line, and an operation, implemented after identification of the faulty transmission line by the search step, of isolating the faulty transmission line by opening the line circuit breakers of the faulty transmission line.

12 Claims, 6 Drawing Sheets

(51) Int. Cl.
| | |
|---|---|
| *H02H 7/122* | (2006.01) |
| *H02H 7/28* | (2006.01) |
| *H02H 1/00* | (2006.01) |
| *H02J 3/36* | (2006.01) |
| *H02H 7/125* | (2006.01) |

(52) U.S. Cl.
CPC .............. *H02H 7/268* (2013.01); *H02H 7/28* (2013.01); *H02J 3/36* (2013.01); *H02H 1/00* (2013.01); *H02H 7/1255* (2013.01)

(56) References Cited

FOREIGN PATENT DOCUMENTS

| CN | 105896488 A | 8/2016 |
|---|---|---|
| FR | 2292362 A1 | 6/1976 |
| WO | WO 2012123015 A1 | 9/2012 |
| WO | WO 2013131782 A1 | 9/2013 |

\* cited by examiner

METHOD FOR CONTROLLING AN INSTALLATION ALLOWING DC CURRENT TO BE TRANSMITTED IN A NETWORK WHILE PROTECTING SAID NETWORK FROM A SHORT CIRCUIT FAULT

CROSS-REFERENCE TO RELATED APPLICATIONS

This application is the United States National Phase of PCT Patent Application No. PCT/FR2017/052306 filed on 30 Aug. 2017, which claims priority to French Patent Application No. 1658165 filed 2 Sep. 2016, both of which are incorporated herein by reference.

FIELD OF THE INVENTION

The field of the invention relates to the transmission of electricity, in particular direct current, within a transmission network that is also known in the field as a High Voltage Direct Current (HVDC) network.

PRIOR ART

Renewable energy sources allow electricity to be generated in order to supply an electrical grid. The renewable energy sources are generally located far away from the consumption zones, resulting in the need to develop new transmission networks capable of transmitting electricity over very long distances while minimizing energy losses. In particular, these new networks can be high voltage direct current transmission networks that will be connected to the already existing alternating current networks. Such networks integrate particular functions and intelligence for supporting the constraints of the network.

One of these functions is the management of the safety of the network in the event of a fault in the network. To this end, it must be possible to be able to isolate the fault as quickly as possible in order to avoid general power cuts. In this respect, various protection strategies have been developed.

Document WO 2013/131782 discloses precisely one possible strategy for controlling an installation comprising a network provided with a group of electricity transmission lines provided with circuit breakers at the ends thereof. This network is linked to converter stations capable of supplying the network with current. In the event of a fault, all the circuit breakers open as soon as the fault is detected in order to prevent the faulty current from exceeding the current interruption capacity of each circuit breaker. It follows that the circuit breakers must be fast and that in some cases it is not impossible for the fault to cause an excessively fast increase in current, such that all or some of the circuit breakers cannot open due to the fact that the breaking capacity thereof has been exceeded. Furthermore, in the event of a failure of a circuit breaker that is configured to open as soon as a fault is detected, the risk involves not being able to properly isolate the fault.

Document WO 20121123015 discloses a transmission network using current limiters to protect zones within the same transmission network, it follows that, in the event of a fault, the entirety of a zone is disconnected in order to prevent the fault from propagating in the other zones.

The thesis, "Control and Protection of Multi-terminal DC Transmission Systems Based on Voltage-Source Converters" published by Lianxiang Tang in January 2003 introduces a strategy whereby circuit breakers are placed at the output of converters and fast switches are placed at each end of line. Upon detection, all the circuit breakers open and, when the current flowing through the fast switches to be opened is zero, said switches can open in order to isolate the faulty line. Furthermore, since all the circuit breakers need to be opened in order to be able to isolate the faulty line using the fast switches, in the event of an opening fault on at least one circuit breaker the duration of the strategy is longer.

It is therefore understood that a requirement exists for improving the existing installations, and in particular the control thereof in order to improve the protection of the network.

Subject Matter of the Invention

The aim of the invention is a particular installation associated with appropriate control of the components thereof in order to improve the safety of the network.

This aim is pursued by virtue of a method for controlling an installation for transmitting electricity comprising a direct current transmission network comprising a group of electricity transmission lines linked to one another, each transmission line comprising a pair of two line circuit breakers arranged at the opposite ends of said transmission line. Said installation comprises a number N of stations for converting alternating current to direct current each associated with a safety system, each converter station being linked to the group of transmission lines and being associated with a maximum contribution of short-circuit current. More specifically, each safety system is capable of interrupting a direct current corresponding to the maximum contribution of short-circuit current of the associated converter station, the line circuit breakers each having a breaking capacity capable of interrupting a direct current corresponding to the highest of the maximum contributions of short-circuit current of the converter stations. Furthermore, the method comprises, following an occurrence of a short-circuit fault on one of the transmission lines, the following steps:

a step of opening at least N-1 safety systems such that, for each safety system that is opened, the contribution to the flow of current through the group of transmission lines originating from the converter station associated with said safety system that is opened is removed;
  a step of finding the short-circuit fault to identify the faulty transmission line;
  a step, implemented after identification of the faulty transmission line by the finding step, of isolating the faulty transmission line by opening the line circuit breakers of said faulty transmission line.

In particular, the method comprises a step of detecting the short-circuit fault on each safety system triggering, for each safety system and after the short-circuit fault has been detected on said safety system, a step of transmitting an opening command, signal to said safety system.

Preferably, the method comprises a step of detecting the short-circuit fault on each line circuit breaker, and the finding step comprises, for each pair of line circuit breakers of the same transmission line and after the short-circuit fault has been detected on the line circuit breakers of said pair, a step of checking for the presence of the short-circuit fault between said line circuit breakers of said pair. The step of isolating the faulty transmission line being implemented only after the presence of the short-circuit fault has been detected on said faulty transmission line by the checking step.

Advantageously, the step of isolating the faulty transmission line comprises a step of monitoring at least one physical feature on each of the two line circuit breakers of said faulty transmission line, each of said two line circuit breakers opening, in particular independently of one another, as soon as the feature monitored in the vicinity thereof is located below a reference threshold.

According to one embodiment, only N-1 safety systems open following the occurrence of the short-circuit fault, with the safety system that remains closed being considered to be in a faulty state.

The method can comprise a step of detecting the failure of the safety system in a faulty state, then a step of disconnecting the electrical connection between the converter station, associated with said safety system in the faulty state, and the group of transmission lines.

In particular, the isolation step is such that opening at least one of the two line circuit breakers is implemented while current is still flowing therethrough.

Preferably, each safety system is selected from: a safety system integrated in the converter station and an independent circuit breaker arranged on an electrical link linking the converter station, associated with said safety system, with said group of transmission lines.

In particular, the method can comprise a step of restoring the network that is implemented after the step of isolating the faulty transmission line, said restoration step comprising closing each safety system that is opened during the opening step, in particular during and following the restoration step the line circuit breakers of said faulty transmission line remain open so that the short-circuit fault of said faulty transmission line is electrically isolated from the other transmission lines of the group.

The invention also relates to an installation for transmitting electricity comprising:
  a direct current transmission network comprising a group of electricity transmission lines linked to one another, each transmission line comprising a pair of two line circuit breakers arranged at the opposite ends of said transmission line;
  a number N of stations for converting alternating current to direct current each associated with a safety system, each converter station being linked to the group of transmission lines and being associated with a maximum contribution of short-circuit current, and:
  each safety system is capable of interrupting a direct current corresponding to the maximum contribution of short-circuit current of the associated converter station;
  the line circuit breakers each have a breaking capacity capable of interrupting a direct current corresponding to the highest of the maximum contributions of short-circuit current of the converter stations:
  the installation is configured to send an opening signal to each safety system when a short-circuit fault originating from the group of transmission lines is detected on said safety system;
  the installation is configured, for each pair of line circuit breakers, to send an opening signal to the line circuit breakers of said pair when the short-circuit fault is detected on the line circuit breakers of said pair and when said short-circuit fault is located between the line circuit breakers of said pair.

The installation can comprise the software and hardware elements for implementing the control method as described.

BRIEF DESCRIPTION OF THE FIGURES

The invention will be better understood upon reading the following description, which is provided solely by way of a non-limiting example and with reference to the drawings, in which.

Throughout these figures, unless otherwise stipulated, the same reference signs are used to denote the same elements.

DESCRIPTION OF PARTICULAR EMBODIMENTS

In particular, the following description differs from the prior art in that it proposes the implementation of a method associated with a particular installation, which particularly allows a failure to be supported in a safety system intended to block the injection of current into the network from a station for converting alternating current to direct current, while allowing a faulty transmission line to be found and then isolated.

Figure 1:
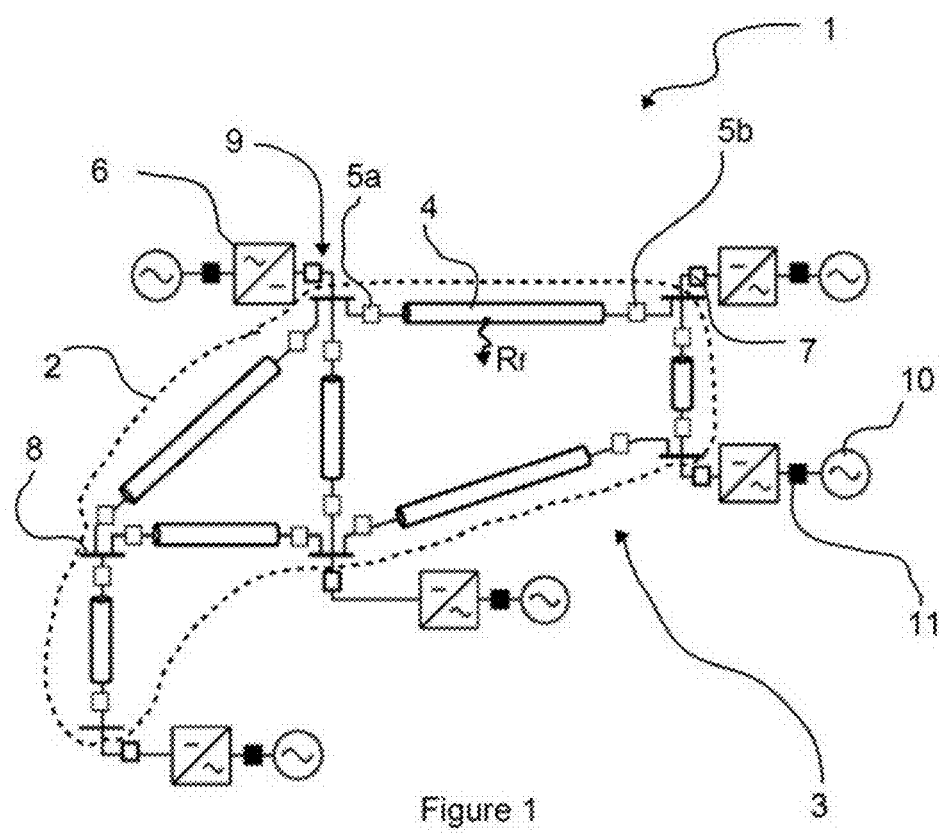
FIG. 1 shows an installation allowing the transmission of direct current electricity according to one particular embodiment.

FIG. 1 shows an installation 1 for transmitting electricity comprising a direct current transmission network 3 (in particular an HVDC network) comprising a group 2 of electricity transmission lines 4 linked to one another (it is understood that these transmission lines 4 allow direct current to flow and are therefore electrically linked to one another), particularly so as to allow direct current to flow through the group 2 of lines. Each transmission line 4 comprises a pair of two line circuit breakers 5a, 5b arranged at the opposite ends of said transmission line 4. In other words, each end of a transmission line comprises a line circuit breaker. The installation further comprises a number N of stations 6 for converting alternating current to direct current, each associated with a safety system 7 therefore, there are also N safety systems 7, each associated with a converter station 6. Each converter station 6 is linked to the group 2 of transmission lines 4, and each converter station 6 is associated with a maximum contribution of short-circuit current. The maximum contribution is a design element, in other words each converter station 6 is designed to have a maximum contribution of short-circuit current. This maximum contribution of short-circuit current corresponds to a contribution of direct current that said station is capable of injecting into the network 3. In this case, it is understood that the group 2 is linked to the N converter stations 6, in particular on the direct side of each converter station 6. In particular, each safety system 7 is such that it comprises a closed state, in which it authorizes the converter station 6 associated with said safety system 7 to contribute to the flow of current through the group 2 of transmission lines 4, and an open state, in which it prevents the converter station 6 associated with said safety system 7 from contributing to the flow of current through the group 2 of transmission lines 4. Thus, each safety system 7 is particularly placed on the direct current side of the converter station 6. The particular example of FIG. 1 shows a network 3 provided with seven transmission lines 4 linked to one another and five converter stations 6 that can contribute to the flow of current through the transmission lines 4 of the group 2 of the network; of course, the illustration in FIG. 1 is only an example, with the topography of the connections between transmission lines being able to be adapted as a function of the desired features of the network.

Based on the aforementioned it is understood that, when referring to N converter stations 6 or N safety systems 7, N is a whole number, the value of which is greater than or equal to 2 or 3. The total number of converter stations 6 will be adapted as a function of the desired current transmission features and in particular the territorial dispersion of the alternating current sources linked to these stations.

In the present description, a transmission line 4 can be formed by any transmission element capable of allowing an electrical power to be transmitted between the two ends of said transmission line 4. Such a transmission element can be, for example, an underwater cable, an underground cable or even an overhead line.

Within the group 2, at least two transmission lines 4 can be directly linked to one another, in particular by means of a busbar 8, and transmission lines 4 can be indirectly linked to one another by means of at least one other transmission line and, if applicable, associated busbars 8. This is essentially what is shown in FIG. 1. In particular, within the group 2 of transmission lines 4, "electricity transmission lines linked to one another" is understood to mean that each transmission line 4 of the group 2 is directly linked to at least one other transmission line of the group, in particular via the ends thereof, by means of a busbar 8, with the same busbar 8 being able to be used to directly link more than two transmission lines 4 to one another. Furthermore, each converter station 6 can be electrically linked, in particular on the direct current side of the converter station 6, to one, and in particular to only one, corresponding busbar 8 by an electrical connection link 9, if applicable this connection link 9 can comprise the safety system 7 associated with said converter station 6.

In the present description, a circuit breaker (for example, a line circuit breaker 5a, 5b, or, if applicable, a safety system 7 as will be seen hereafter) is a system selectively allowing the through flow of direct current or blocking the through flow of direct current, reference is then made to a direct current circuit breaker. More specifically, the circuit breaker is said to be closed when it allows the through flow of direct current, reference is then made to the closed state of the circuit breaker, and is open when it blocks the through flow of direct current, reference is then made to the open state of the circuit breaker. A circuit breaker can be controlled from a setpoint that allows it to switch from its closed state to its open state, or vice versa. As defined in the present description, a circuit breaker has a breaking capacity, with the breaking capacity being defined as a maximum value of current flowing therethrough, for which it can switch from the closed state to the open state. The breaking capacity of a circuit breaker therefore corresponds to a capacity to interrupt the current of said circuit breaker in other words, in general when a current flows through the circuit breaker that is greater than that associated with its breaking capacity, it does not open since an associated protection (the relay that will be described hereafter) does not send it the opening setpoint as long as the current measured on the circuit breaker, i.e. the current flowing through the circuit breaker, is greater than the breaking capacity, since otherwise there is a risk of damaging the circuit breaker or of initiating internal protection to prevent the circuit breaker from being destroyed. In the field, the circuit breaker is also known as a "Direct Current Circuit Breaker" (DCCB).

Within the context of the line circuit breakers 5a, 5b, when the line circuit breakers 5a, 5b of the same transmission line are in a closed state, this allows direct current to flow through said transmission line between the two ends of said transmission line, and when the line circuit breakers 5a, 5b of the same transmission line are in the open state, the transmission of current between the two ends of the transmission line is interrupted the transmission line is then said to be isolated from the other transmission lines of the group 2, since it no longer provides its function for transmitting direct current between the two ends thereof. Furthermore, when, for one transmission line, only one of the line circuit breakers is open, the transmission of power is interrupted without the transmission line having to be isolated: in order to isolate a transmission line these two line circuit breakers must be open.

In the present description, a station 6 for converting alternating current to direct current allows, for example, an alternating current originating from an alternating current source 10, such as, for example, an alternating current electricity network or a wind farm, to be converted to direct current with a view to injecting the direct current into the direct current electricity transmission network. A converter station 6 may or may not have a direct current cut-off function, this point will be developed in further detail hereafter. The contribution of a converter station to the flow of current through the group 2 of transmission lines 4 can be such that current is extracted from the group 2 of lines or is injected into the group 2 of lines via the converter station 6 in order to provide a production/consumption balance and the stability of the network, which can be implemented by a control function inside the converter station 6.

In the present description, when reference is made to a contribution of a converter station 6, it involves the contribution of the converter station 6 to the flow of direct current through the group 2 of transmission lines 4 to which it is linked. Furthermore, the association of a safety system 7 with a converter station 6 is such that the direct current originating from the converter station and contributing to the flow of current through the group 2 flows through said safety system 7, particularly before flowing through the group 2 of transmission lines 4.

Preferably, each safety system 7 is able to/configured to interrupt a direct current corresponding to the maximum contribution of short-circuit current of the converter station 6 associated with said safety system 7. In this respect, a safety system 7 selectively allows the through flow of direct current or the blocking of the through flow of direct current between the converter station 6 and the group 2 of transmission lines 4 of the network. It is understood from the aforementioned that the structure of the installation is such that each safety system 7 allows, when it is open, the contribution to the flow of current through the group 2 of transmission lines 4 from a single converter station 6 with which it is associated to be removed. A safety system 7 can be a circuit breaker, in particular of the type as previously described, or can be integrated in a function of the converter station 6. When a safety system 7 is a circuit breaker, it is interposed between the converter station 6 and the group 2 of transmission lines 4, so that the contribution of the converter station 6 flows through said safety system 7 in the closed state of said circuit breaker. In the open state of the circuit breaker forming the safety system 7, the contribution of the converter station 6 associated with the flow of current through the network 2 is removed. FIG. 1 particularly shows this case, in which the safety systems 7 are all formed by circuit breakers.

The maximum contribution of short-circuit current of a converter station 6 corresponds to the current injected when a short-circuit current fault appears at the terminals thereof, it, is therefore independent of the group 2 of transmission lines with which it is linked, but depends on the features of the converter station 6 and of the alternating current network with which it is linked. As this contribution of short-circuit current is maximal, any short-circuit fault occurring within the group 2 of transmission lines 4 cannot be supplied with current by said converter station 6 above this maximum contribution of short-circuit current. The design of each of the safety systems 7 so as to be able to (i.e. configured to) interrupt a current flowing therethrough that corresponds to the maximum contribution of the associated station allows the contribution of the converter station 6 to the faulty current in the group 2 of lines to be removed, irrespective of the short-circuit fault in the direct current network. In this respect, in the event of a short-circuit fault in the group 2 of transmission lines 4 of the network (i.e. in/on a transmission line 4 of the group 2), this short-circuit fault can be detected on each safety system 7 that is designed to open irrespective of the short-circuit fault within the group 2, unless this safety system 7 is in a failure state. In the present description, a short-circuit fault corresponds to an anomaly on a transmission line that causes a short-circuit on said line reference is then made to a faulty transmission line. An anomaly therefore can correspond to an electrical isolation fault, such as a break in electrical isolation, or even a human error, for example, incorrect closure of a grounding isolator.

In the present description, when a short-circuit fault is detected on a safety system 7 or a line circuit breaker 5a, 5b, it is understood that the faulty current flows through the safety system 7, or the line circuit breaker 5a, 5b, and that a measurement of one or more close physical quantity(ies) is used to determine whether this faulty current effectively flows through the safety system 7 or the line circuit breaker 5a, 5b.

Figure 2:
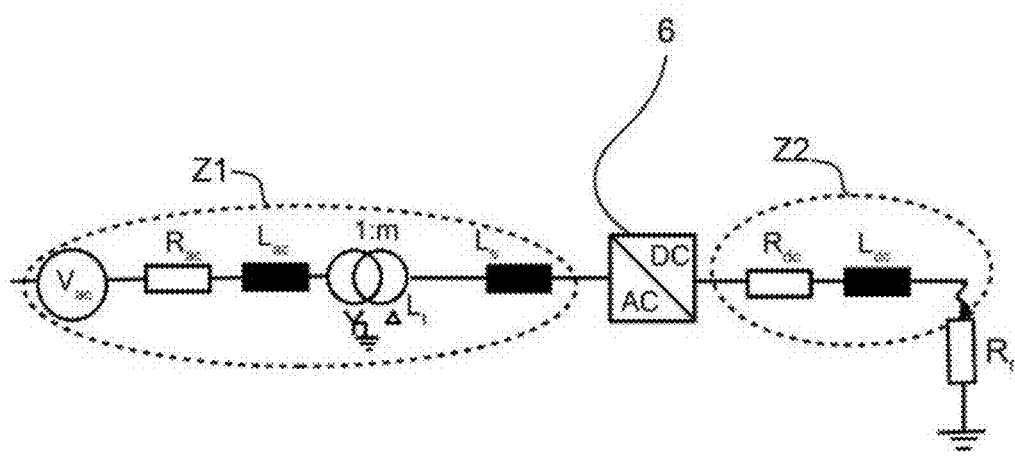
FIG. 2 shows the components of the installation allowing the contribution of a converter station to a short-circuit current to be computed in the event of a short-circuit fault in the network.

During a steady-state phase of the occurrence of the fault for which none of the line circuit breakers 5a, 5b and safety systems 7 is open, and after a transitional phase of several ms after the fault has occurred, the contribution of a converter station 6 to the resistance $R_f$ short-circuit fault, also called short-circuit contribution current when the converter station is a Modular Multilevel Converter (MMC), can be determined by:

$$I_o^{avg} = \frac{3}{\pi} \cdot \frac{\sqrt{\frac{2}{3}} \cdot m \cdot V_{ac}}{\sqrt{X^2 + R^2}}$$

$$X = (\omega \cdot L_{ac} + \omega \cdot L_t) \cdot (m)^2 + \omega \cdot L_s + \frac{1}{2} \cdot \omega \cdot L_{arm}$$

$$R = (m)^2 \cdot R_{ac} + \frac{2}{3} \cdot R_f + \frac{2}{3} \cdot R_{ac}$$

where "." represents a simple multiplication, and with reference to the diagram of FIG. 2 separating, on one side, which occurs electrically on the alternating current side (zone Z1) and which occurs electrically on the direct current side (zone Z2). Zones Z1 and Z2 are separated by a converter station 6 that links them together. With $V_{ac}$ being the 28 voltage of the alternating current source, with m representing, in the above equations, the transformation ratio of the transformer on the alternating current side, $L_{arm}$ being the inductance on each arm of the MMC converter, $R_f$ being the resistance of the short-circuit fault, $R_{dc}$ corresponding to the equivalent resistance of the portion of the network located between the relevant converter station and the short-circuit fault, $L_{dc}$ corresponding to the inductance of the portion of the network located between the relevant converter station and the short-circuit fault (in this case not taken into account since the steady-state is being studied), $L_{ac}$ corresponding to the equivalent inductance of the alternating network, $L_s$ corresponding to the inductance for filtering the harmonics (which can be neglected), $L_t$ corresponding to the inductance of the transformer brought to the secondary, $R_{ac}$ corresponding to the equivalent resistance of the alternating network, $\omega$ being equal to $2*\pi*f$, with f being the nominal frequency of the network, and $\pi$ corresponding to the number Pi. Thus, it follows from the aforementioned that in general the opening setpoint of a safety system 7 is sent during the stated transitional phase since, in general, the steady-state phase is never reached since the protection must be fast. Consequently, knowing that the maximum current arrives during the transitional period, and knowing $i_o^{avg}$, it is possible to estimate the maximum fault current that will occur during the transitional period, this estimated value can be used as a reference and is approximately 20 kA.

As mentioned above, there is a probability, even if it is low, that one of the safety systems 7 can be faulty, and it is this fault that needs to be compensated in order to restore the flow of current through the group 2 of transmission lines 4 of the network as quickly as possible in the event of a short-circuit fault in (i.e. on) a transmission line 4. Indeed, in the event of a failure of a safety system 7, said system will continue to allow through the contribution of the converter station associated with the flow of current through the network 3 and, more specifically, through the group of transmission lines 4.

It is in this respect that the line circuit breakers 5a, 5b each have a breaking capacity able to, i.e. configured to, interrupt a direct current corresponding to the highest of the maximum contributions of short-circuit current of the converter stations 6 in this case it is understood that if only one safety system 7 is faulty, such that it does not open following the detection of the short-circuit fault thereon, the line circuit breakers 5a, 5b for their part will be capable of opening in order to isolate the transmission line 4 comprising the short-circuit fault, since they are designed to compensate for the current remaining in the group 2 of transmission lines 4 when a single converter station 6 still supplies the short-circuit fault: it follows that there is no need to wait for a possible safety element 11 (FIG. 1) on the alternating current side to open in order to safeguard the safety system 7.

Figure 3:
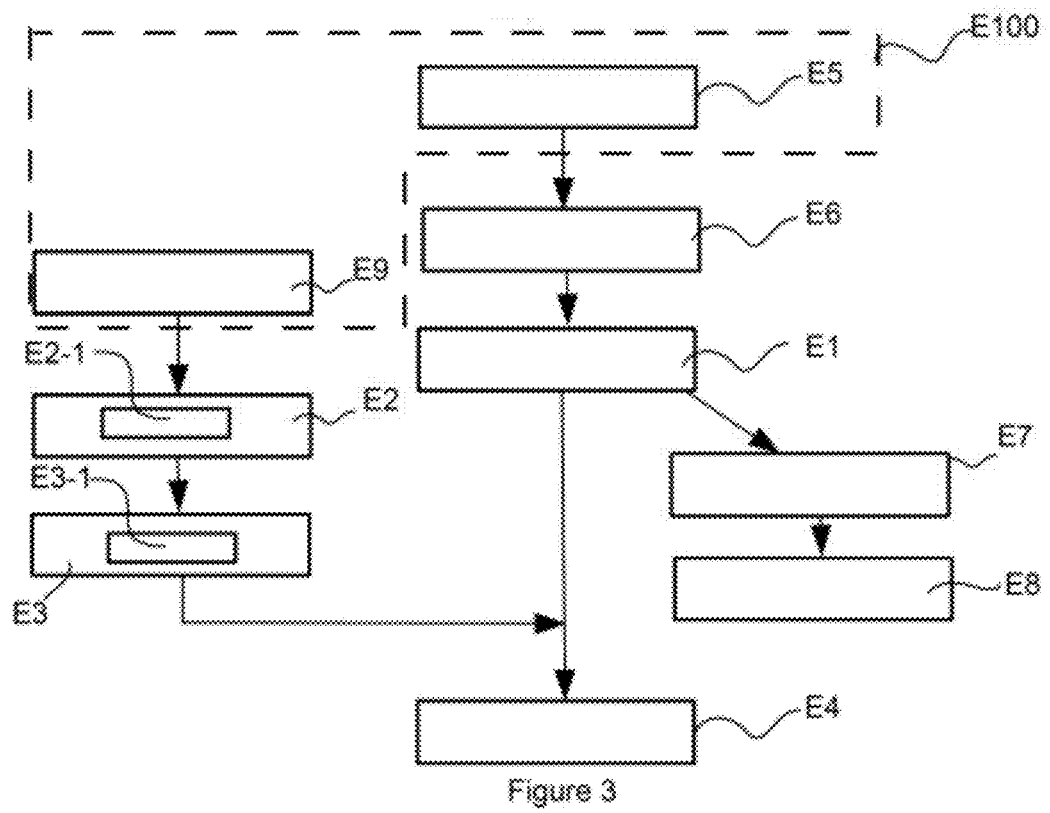
FIG. 3 schematically shows various steps of a particular embodiment of the method for controlling the installation.

In order to improve the management of the installation, and particularly to allow faster restoration of the flow of current through the direct current transmission network, the particular architecture of the installation 1 described above will be associated with the steps of a method for controlling the installation that are implemented upon detection of a short-circuit fault within the network 3, in particular on a transmission line 4 of the group 2 between the two line circuit breakers 5a, 5b of said transmission line 4, then denoted faulty transmission line. The term "controlling an installation" is understood to be the controlling and monitoring of this installation, as well as the decisions taken with respect to the operation of the constituent elements of this installation, such as the safety systems or the line circuit breakers as described. Thus, the method comprises (FIG. 3), following an occurrence of a short-circuit fault, in particular of resistance $R_f$, on one of the transmission lines 4, in particular between the two line circuit breakers 5a, 5b of said transmission line 4, the following steps:

a step E1 of opening at least N-1 safety systems 7 such that, for each safety system 7 that is opened, the contribution to the flow of current through the group 2 of transmission lines 4 originating from the converter station 6 associated with said safety system 7 that is opened is removed within the group (there is then a transition to a transitional degraded mode involving future restoration of all or some of the converter stations to the flow of current within the group);

a step E2 of finding the short-circuit fault to identify the faulty transmission line 4;

a step E3, particularly implemented after identification of the faulty transmission line 4 by the step E2 of finding the short-circuit fault, of isolating the faulty transmission line 4 by opening the line circuit breakers 5a, 5b of said faulty transmission line 4.

It is understood from the aforementioned that the method comprises, before the occurrence of the short-circuit fault, a nominal operation phase, in which the N converter stations 6 contribute to the flow of current through the group 2 of transmission lines 4. In this nominal operation phase, the safety systems 7 are all in the closed state and the line circuit breakers of the lines of the group 2 of lines 4 that are linked to one another are in, in particular are all in, the closed state. Following the occurrence of the short-circuit fault, the method switches to a degraded operation phase, during which steps E1, E2, E3 are implemented.

Of course, the method can also comprise a step E4 of restoring the network that is implemented after the step E3 of isolating the faulty transmission line 4. This restoration step E4 comprising closing each safety system 7, in particular of at least N-1 safety systems 7, that is opened during the opening step E1 In particular, during and following the step E4 of restoration, the line circuit breakers 5a, 5b of said faulty transmission line 4 remain open so that the short-circuit fault of said faulty transmission line 4 is electrically isolated from the other transmission lines 4 of the group 2, in particular until the subsequent repair of the faulty transmission line 4. In this respect, following repair, i.e. removal of the short-circuit fault from the faulty transmission line, the line circuit breakers of the isolated transmission line can be re-closed so that said transmission line can again participate in the transmission of the direct current. Thus, it is understood that on completion of the restoration step E4, the method returns to a new nominal operation phase, in which each safety system 7 that is opened during the degraded operation phase is in a closed state and only the line circuit breakers 5a, 5b that remained in the closed state at the end of the degraded operation phase remain in the closed state, i.e. the line circuit breakers 5a, 5b that opened remain in the open state.

In particular, it is said that the result of the occurrence of the short-circuit fault a step E100 of detecting this short-circuit fault causing the implementation of the step E1 of opening at least N-1 safety systems 7, the step E2 of finding the faulty transmission line 4 and the isolation step E3. In fact, the short-circuit fault propagates in the group 2 of transmission lines 4, such that it is detectable on each of the line circuit breakers 5a, 5b and on each of the safety systems 7 linked to the group 2 of transmission lines 4. As mentioned above, the detection of a short-circuit fault on a safety system 7 can be implemented by measuring one or more physical quantity(ies) in the vicinity of the safety system representing the current flowing through the safety system: it is then easy to know whether the short-circuit current flows through the safety system.

More specifically, the method can comprise a step E5 of detecting the short-circuit fault, in particular of resistance $R_f$, on each safety system 7 triggering, for each safety system 7 and after said short-circuit fault has been detected on said safety system 7, a step E6 of transmitting an opening command signal to said safety system 7 with a view to implementing the step E1. In particular, the method is such that, as soon as the short-circuit fault is detected on a safety system 7, the order to open said system is provided.

It is understood from the aforementioned that a distinction can be made between two cases. In a first ideal case, the N safety systems 7 open (the opening step E1 allows N safety systems 7 to be opened), thus allowing the line circuit breakers 5a, 5b to provide their function for isolating the faulty transmission line 4 of the group 2, after the fault has been detected thereon, independently of the disconnection safety of the group 2 of transmission lines 4 provided by the safety systems 7: the functions are parallelized with distinct systems, thus improving the general safety of the installation and the isolation time of the faulty transmission line 4. Furthermore, in this case ultrafast line circuit breakers 5a, 5b do not need to be used since the aim of opening the safety systems 7 is to lower the value of the current flowing through the group of transmission lines 4 to a level that allows the line circuit breakers 5a, 5b to be opened. Indeed, in this first case, the presence of the short-circuit fault can cause the current flowing through the line circuit breakers 5a, 5b of the faulty transmission line to increase to a level that is greater than the respective breaking capacities thereof, opening the safety systems 7 will allow this current to drop to a value that allows said line circuit breakers 5a, 5b to be opened. In a second case, only N-1 safety systems 7 open following the occurrence of the short-circuit fault, in particular of the resistance $R_f$, with the safety system 7 that remains closed being considered to be in a faulty state. In this second case, the architecture of the installation and the control as described allow completely safe isolation of the transmission line 4 comprising the short-circuit fault, since the line circuit breakers 5a, 5b will be capable of opening even if the group 2 of transmission lines 4 is still supplied with current by a single converter station 6, since its contribution to the flow of current will be lower than the breaking capacity of the line circuit breakers.

In general, a safety system 7 in a faulty state must not continue to be used, as represents a risk for the installation. A safety system 7 is considered to be in a faulty state when a short-circuit fault has been detected thereon and it has not opened, in particular despite the transmission of an opening setpoint thereto. In this respect, the associated converter station 6 needs to be isolated. Consequently, the method can comprise a step E7 of detecting the failure of the safety system 7 in a faulty state, then a step E8 of disconnecting the electrical connection between the converter station 6, associated with said safety system 7 in a faulty state, and the group 2 of transmission lines 4. After the disconnection step E8, a message can be sent to a monitoring unit to request, for example, an inspection of the safety system 7 in a faulty state with a view to commencing the repair thereof. For example, in order to detect the failure of the safety system 7, the current flowing through the safety system 7 can be monitored (said safety system 7 being interposed between the converter station 6 and, the group 2), if this monitored current corresponds to a faulty short-circuit current after the opening setpoint has been sent to the safety system 7 and after an estimated opening time, at the end of which said system should be open, then said system can be considered to be faulty.

Figure 4:
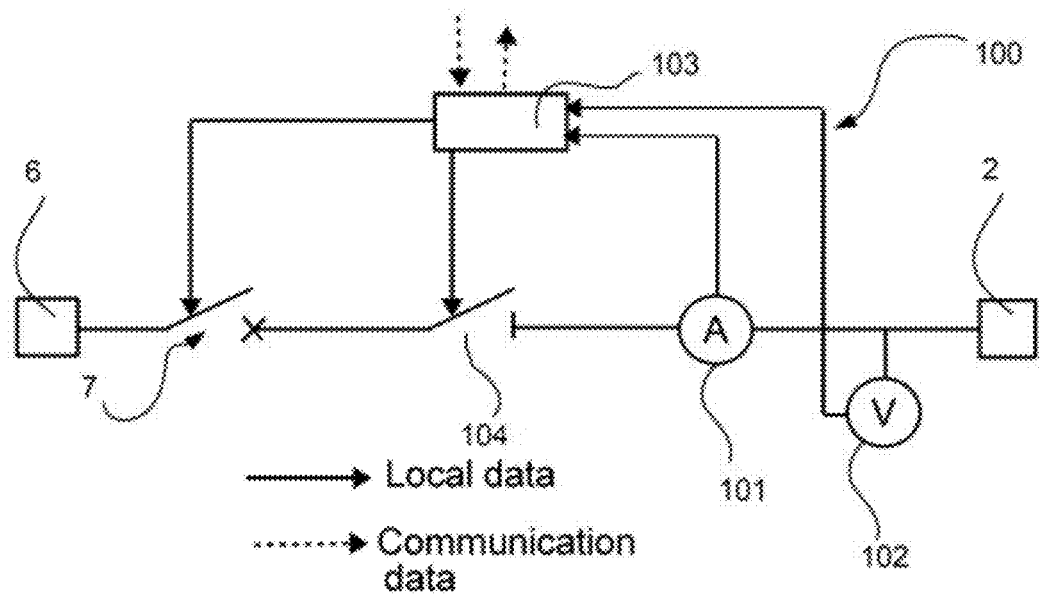
FIG. 4 shows a protection module associated with a safety system.

In particular, as shown in FIG. 4, each safety system 7 can be associated with a protection module 100 allowing, for example, the current to be monitored via a current measurement element 101 and the voltage to be monitored via a voltage measurement element 102 on said safety system 7. It is this protection module 100 that will allow the short-circuit fault to be detected by virtue of a relay 103 on the module 100 that takes as input the data originating from the current 101 and voltage 102 measurement elements. The relay 103 is then configured, when it detects a short-circuit current, to send the opening control signal to the safety system 7 with which it is associated. FIG. 4 shows the protection module 100 that can be used in association with a circuit 15 breaker-type safety system 7 placed between the converter station 6 and the group 2 of transmission lines 4, the protection module 100 comprises the relay 103 linked to the current measurement element 101 and/or to the voltage measurement element 102. In particular, the voltage and current information are complementary, a fault can be measured from the current only, from the voltage only or from the voltage and the current, which can depend on the type of fault, for example, if the fault resistance is zero then the short-circuit current alone can suffice, if the fault resistance is very high (Rf>>) then the voltage can suffice. Furthermore, the protection module 100 can comprise an isolator 104 located between the safety system 7 and the group 2 of transmission lines, this isolator 104 can allow disconnection of the electrical connection between the converter station 6, associated with said safety system 7 in a faulty state, and the group 2 of transmission lines. The order to open the isolator 104 can originate from the relay 103, which particularly monitors the current via the current measurement element 101 following the transmission of the opening setpoint, and which is configured to implement the aforementioned steps E7 and E8. The data originating from the measurement elements 101 and 102, as well as the opening orders of the safety system and of the isolator 104, are local data. The relay 103 can also communicate with the outside by virtue of the use of "communication data", this communication data can be, for example, a transmission of a faulty state detected for a safety system. The relay 103 can also communicate with other relays 103 associated with other safety systems through communication means, for example, an optical fiber. Thus, depending on the applications, it is possible to exchange information between relays 103, for example, to reassemble the transmission of the faulty state, from the data measured or computed on the module, etc. Communication means other than optical fiber can be implemented, for example, via a dedicated conductor or via radio communication.

It is understood from the aforementioned that in the event of a short-circuit fault, in particular of resistance $R_f$, on a transmission line 4, this short-circuit fault will propagate in all the transmission lines of the network and will also be seen by the safety systems 7 linked to the group 2 of transmission lines 4. In general, the result of the short-circuit fault is that it will drain a certain amount of current on the transmission line comprising the fault, such that the current flowing through the line circuit breakers 5a, 5b of the transmission line 4 comprising the fault will exceed the breaking capacity of said line circuit breakers 5a, 5b, which will not be able to open. In this respect, the function of the safety systems 7 is to remove the contribution of the converter stations 6 to allow the current flowing through the line circuit breakers 5a, 5b of the transmission line 4 comprising the fault to drop below a threshold that allows said line circuit breakers 5a, 5b to open in order to isolate the transmission line 4 comprising the fault. With respect to the line circuit breakers 5a, 5b, their function preferably is to not open only if the fault is located between two line circuit breakers 5a, 5b of the same transmission line 4.

It is understood from all of the aforementioned that the line circuit breakers 5a, 5b of the same transmission line 4 operate so that the opening thereof is not immediate or instantaneous in the event of the detection of the short-circuit fault thereon, since, preferably, an attempt will be made to check for the presence of the fault between them before triggering the opening thereof; furthermore, before they are opened, a check will also be made to determine whether the current flowing therethrough is below a predetermined threshold: thus, only the line circuit breakers 5a, 5b open of the same line between which the short-circuit fault has been located, with the others remaining in the closed state, with this strategy allowing the speed of the restoration of the network to be increased since the other line circuit breakers that have not broken will already be ready for the restoration.

Figure 5:
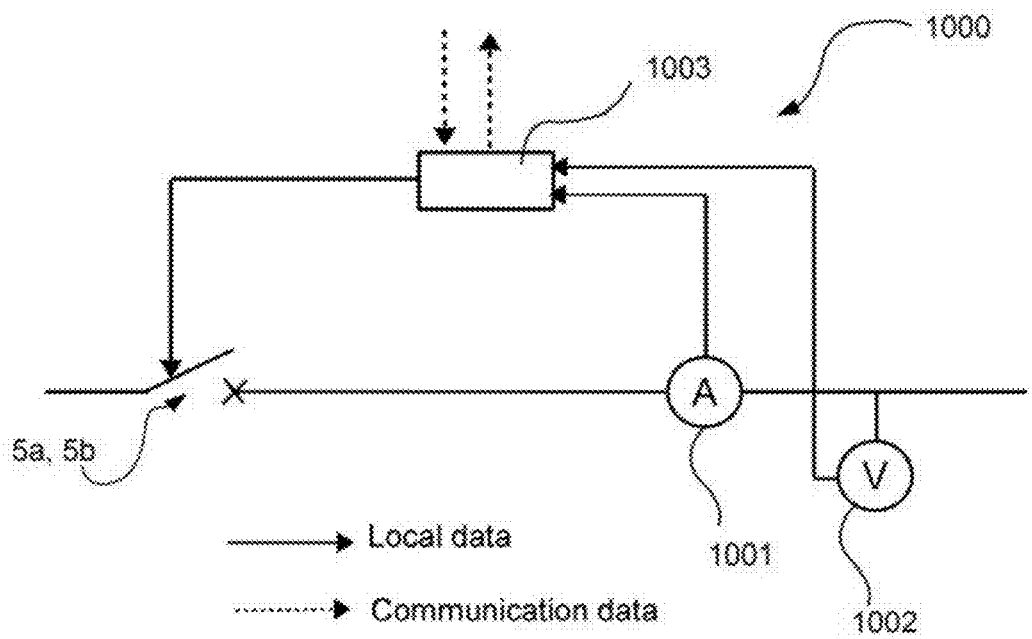
FIG. 5 shows a protection element associated with a line circuit breaker.

More specifically, the method comprises (FIG. 3) a step E9 of detecting the short-circuit fault, in particular of resistance $R_f$, on each line circuit breaker 5a, 5b, and the finding step E2 comprises, for each pair of line circuit breakers 5a, 5b of the same transmission line 4, and after the short-circuit fault has been detected on the line circuit breakers 5a, 5b of said pair, a step E2-1 of checking for the presence of the short-circuit fault $R_f$ between said line circuit breakers 5a, 5b of said pair. Subsequently, the step E3 of isolating the faulty transmission line 4 is implemented only after the presence of the short-circuit fault has been detected on said faulty transmission line 4 by the checking step E2-1: therefore, in this case, the line circuit breakers between which the fault has been located are opened. As mentioned above, the detection of a short-circuit fault on a line circuit breaker can be implemented by measuring one or more physical quantity(ies) in the vicinity of the line circuit breaker representing the current flowing through the line circuit breaker: it is then easy to know whether the short-circuit current flows through the line circuit breaker. In other words, this can be implemented by associating, for example, each line circuit breaker 5a, 5b (FIG. 5) with a protection element 1000 allowing, for example, the current to be monitored via a current measurement element 1001 and the voltage to be monitored via a voltage measurement element 1002 on said line circuit breaker 5a, 5b. It is this protection element 1000 that will allow the short-circuit fault to be detected by a relay 1003 of the protection element 1000 taking as input the data originating from the current 1001 and voltage 1002 measurement elements (use of "local data"). Furthermore, the relays 1003 of two protection elements 1000 associated with the line circuit breakers 5a, 5b of the same transmission line can communicate with each other (use of "communication data") in order to compare their local data with a view to checking together for the presence of the short-circuit fault. For example, the presence of current flowing in the same direction toward the fault on the two line circuit breakers of the same transmission line 4 can be assimilated with the presence of the short-circuit fault. In other words, the presence of current on two line circuit breakers of the same transmission line flowing toward the inside of said transmission line can be assimilated with the presence of the short-circuit fault. To enable comparison of the data originating from two protection elements associated with the line circuit breakers 5a, 5b, the transmission line 4 can comprise a communication element such as, for example, an optical fiber linking the relays 1003 of the two protection elements 1000 associated with the line circuit breakers 5a, 5b of said transmission line 4. The aforementioned data to be compared are not necessarily measurement data; binary signals can be involved, for example. The relays 1003 can then exchange information through a communication means, such as an optical fiber. According to one embodiment, inductors can be added to each end of a transmission line and, in this case, the fault can be identified on the basis of the voltage measurements: however, this solution only works in the event that the transmission lines are cables and the fault has low resistance. Comparing data on two circuit breakers of the same line in order to deduce therefrom whether or not a short-circuit fault is present between said two circuit breakers is a notion that is known to a person skilled in the art and will not be described in detail herein. When the check for the presence of the short-circuit fault $R_f$ between the two line circuit breakers 5a, 5b of the same transmission line 4 is positive, the associated relays 1003 can send a control signal to said line circuit breakers 5a, 5b in order to request the opening thereof, particularly when the current flowing therethrough is less than their respective breaking capacities, as will be seen in further detail hereafter; the relays 1003 are therefore configured to implement the previously described finding E2 and isolation E3 steps. The local data shown in FIG. 5 corresponds to the data measured by the elements 1001 and 1002 and to the setpoints sent to the associated line circuit breaker 5a, 5b.

As mentioned above, the line circuit breakers 5a, 5b have a breaking capacity. Furthermore, a circuit breaker, in particular a line circuit breaker, is capable of opening while current is still flowing therethrough and when this current is below a reference threshold corresponding to the breaking capacity of said circuit breaker. In this respect, the step E3 of isolating the faulty transmission line 4 preferably comprises a step E3-1 of monitoring at least one physical feature on each of the two line circuit breakers 5a, 5b of said faulty transmission line, with each of said two line circuit breakers 5a, 5b opening, particularly independently of each other, as soon as the feature monitored thereon is located below a reference threshold. Of course, the steps of monitoring and of opening are only performed for the line circuit breakers 5a, 5b of the same line following identification of the presence of the short-circuit fault between them. The monitored feature can be the current flowing through the line circuit breaker 5a, 5b and the reference threshold can be a current threshold associated with the breaking capacity of said circuit breaker. Typically, in the event of the use of mechanical line circuit breakers 5a, 5b, the reference threshold is 20 kA, such that the line circuit breaker can receive an opening setpoint as soon as the current flowing therethrough drops below 20 kA. In this respect, if the short-circuit fault, in particular of resistance $R_f$, ever causes an increase in current above the reference threshold, the opening of N-1 safety systems 7 will allow a drop in current to be generated on the line circuit breakers 5a, 5b forming part of the transmission line 4 comprising the short-circuit fault it will thus be possible to isolate the faulty transmission line 4 as soon as possible, and particularly when current still flows through the line circuit breakers of the faulty transmission line 4. Restoring the flow of current through the group 2 of transmission lines 4, in which the transmission line in which the fault is located is electrically isolated from the other lines of the group 2, will be even faster when the transmission line on which the short-circuit fault is identified is quickly isolated from the other transmission lines of the group 2. It is then understood that, preferably, the isolation step E3 is such that opening at least one of the two, and in particular both, line circuit breakers 5a, 5b is implemented while current is still flowing therethrough.

Figure 6:
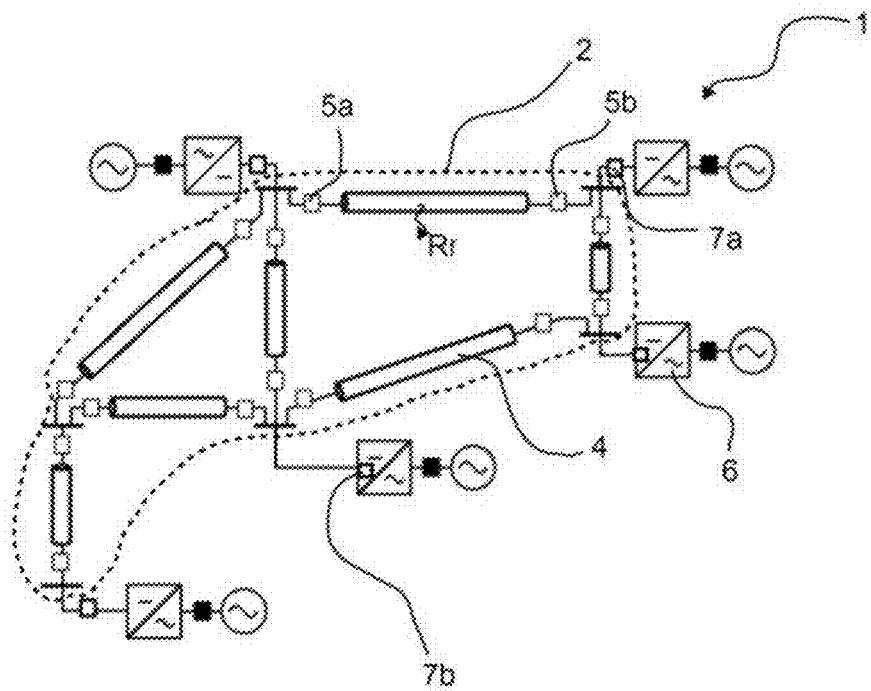
FIG. 6 shows a variation of the installation of FIG. 1.

As previously mentioned, the safety system 7 may or may not be integrated into the converter station 6. In the example shown in FIG. 1, the safety systems 7 are all distinct from the converter stations 6 and are particularly formed by mechanical circuit breakers, preferably identical to those of the line circuit breakers 5a, 5b. Alternatively, FIG. 6 shows an installation comprising safety systems 7a that are distinct from the converter stations and safety systems 7b integrated in the converter stations 6. The safety systems 7a are circuit breakers, preferably identical to those of the line circuit breakers 5a, 5b, and the safety systems 7b are a function of the converter station that then has a breaking capacity. A converter station 6 with a known breaking capacity can be an H-bridge modular multilevel converter or a full-bridge converter, also known as full-bridge MMC. When the converter station 6 does not have integrated breaking capacity, it can be a half-bridge multilevel modular converter, also known as half-bridge MMC. According to yet another alternative (not shown), the N safety systems 7 can be integrated in corresponding converter stations. In other words, each safety system 7 can be selected from: a safety system 7 integrated in the converter station 6 and an independent circuit breaker arranged on an electrical link linking the converter station 6, associated with said safety system 7, to said group 2 of transmission lines 4.

It is understood from the aforementioned that the invention also relates to an installation for transmitting electricity, through which each safety system 7 is able to, i.e. configured to, interrupt a direct current corresponding to the maximum contribution of short-circuit current of the converter station 6 associated with said safety system 7, and the line circuit breakers 5a, 5b each have a breaking capacity able to, i.e. configured to, interrupt a direct current corresponding to the highest of the maximum contributions of short-circuit current of the converter stations 6. The installation is configured to send an opening signal to each safety system 7 when a short-circuit fault originating from the group 2 of transmission lines 4 (particularly located on a transmission line 4 of the group 2 between two line circuit breakers 5a, 5b of said transmission line 4) is detected on said safety system 7. Finally, the installation is configured, for each pair of line circuit breakers 5a, 5b, to send an opening signal to the line circuit breakers 5a, 5b of said pair when the short-circuit fault is detected on the line circuit breakers 5a, 5b of said pair and when said short-circuit fault is located between the line circuit breakers 5a, 5b of said pair. It is understood that the installation can comprise the software and hardware elements for implementing the method as previously described.

Figure 7:
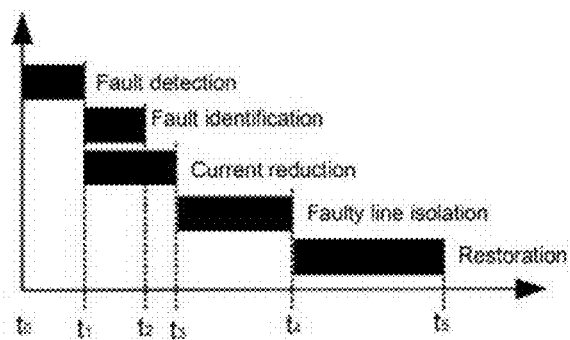
FIG. 7 shows a time sequence showing what happens on the installation in the event of a short-circuit fault on a transmission line.

FIG. 7 shows a timing diagram associated with the strategies for controlling the installation in the first and second cases described above. At $t_0$, the short-circuit fault occurred on a transmission line of the group 2 of lines of the network 3. Between $t_0$ and $t_1$, the fault is detected on the safety systems 7 and on the line circuit breakers 5a, 5b, in particular by the protection modules and the protection elements associated therewith. Between $t_1$ and $t_2$, the line protection elements 1000 provide their function for finding and identifying the transmission line comprising the short-circuit fault. At the same time, between $t_1$ and $t_3$, the safety systems 7 open (at least N-1 of them), thus triggering a reduction in the short-circuit current flowing through the group 2 of lines of the network 3. In this case, it is considered that, before $t_3$, the current is too high to allow isolation of said transmission line comprising the short-circuit fault. Between $t_3$ and $t_4$, the faulty transmission line 4 is isolated from the rest of the lines of the group 2 of lines, and at the end of this isolation, between $t_4$ and $t_5$, the power is restored in the network 3. It is understood from this timing diagram that implementing the steps of the method will depend on the propagation time of the short-circuit fault and on the reaction time of the components of the installation. In this respect, the restoration step E4 can be triggered as a function of a reference time, for which the installation is considered to be stabilized by isolating the faulty transmission line. Typically, the restoration step E4 comprises, for each safety system 7, a step of monitoring the elapsed time since the opening of said safety system 7 with a temporal threshold, and when the temporal threshold is reached, a closure setpoint is sent to the safety system 7, which closes in order to again authorize the associated converter station 6 to participate in the flow of current through the group 2 of transmission lines 4. This step of monitoring the elapsed time can be implemented by the relay 103 of the protection module 100 associated with said safety system 7, which triggers a timer when it sends the opening setpoint to the corresponding safety system 7. When this timer reaches the value of the temporal threshold, the relay 103 automatically sends a closure setpoint to the associated safety system 7. Alternatively, larger scale overall monitoring can be implemented in the sense that the setpoint transmissions are carried out after effective detection of the proper operation of the preceding sequences, with this involving, for example, local checks of the states of the safety systems.

In the present description, a group 2 of transmission lines 4 can form an electric pole, in particular, for example, a positive pole or a negative pole. It is therefore understood that the installation can comprise a plurality of groups of lines, each group of lines is associated with a pole and forms an assembly associated with N corresponding converter stations, each associated with a corresponding safety system. In the field, the various groups of transmission lines form a whole, called direct current transmission network. The method described above can be implemented for each electric pole: in other words, everything that has been previously mentioned in the 28 present, description relates to a group of transmission lines but can be more generally applied to different groups of transmission lines of an installation.

Figure 8:
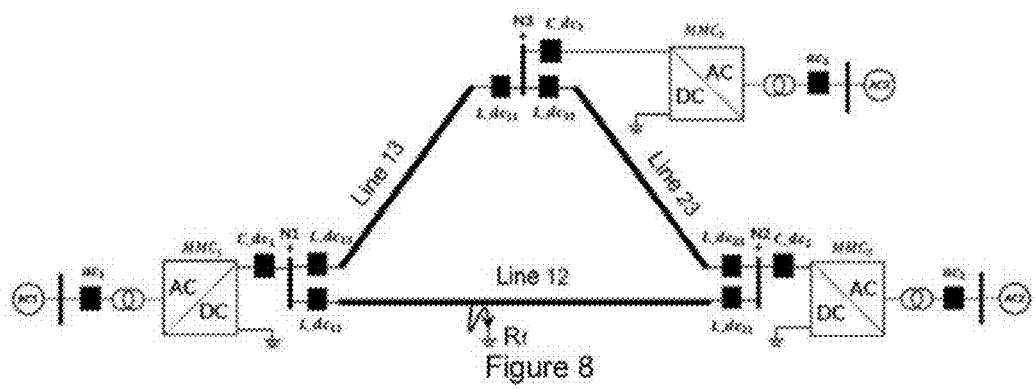
FIG. 8 shows a particular example of an installation in which the transmission lines are arranged in a Delta configuration.
Figure 9:
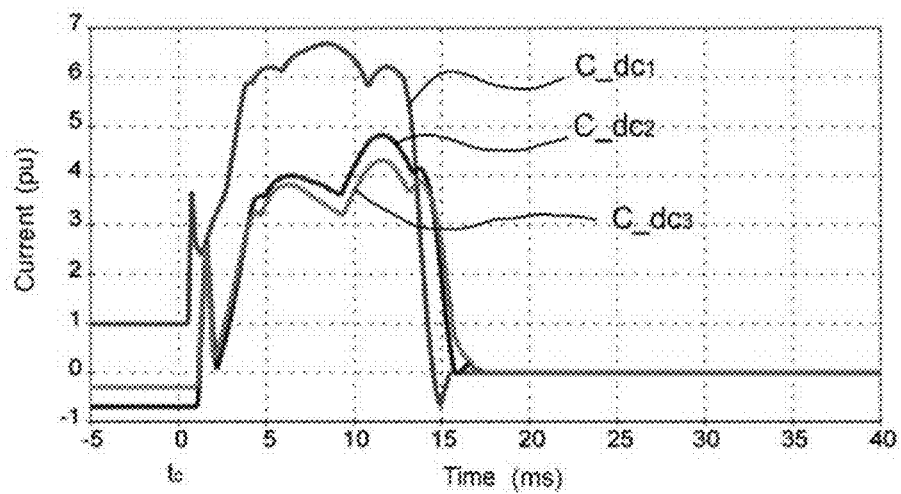
FIG. 9 shows, for a first case, the current on the direct side of the converter stations of FIG. 8 during the time following the occurrence of a short-circuit fault in a transmission line.
Figure 10:
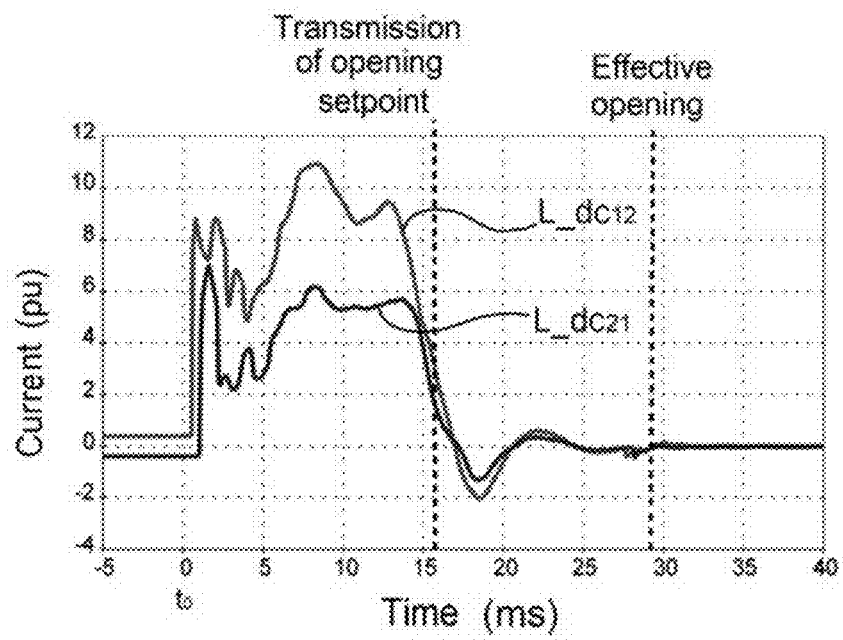
FIG. 10 shows, for the first case, the current flowing through the line circuit breakers of the faulty line of the installation of FIG. 8 during the time following the occurrence of the short-circuit fault.

A particular example of a protection sequence will be described hereafter with respect to the strategy proposed within the scope of the present method for an installation, shown in FIG. 8, of a group of transmission lines comprising three transmission lines, each transmission line being, in the example, formed by a Delta type cable "Line 13; Line 12; Line 23" with three terminals "N1: N2; N3". The group of lines in this case is a group of lines associated with a positive pole. Each terminal "N1; N2; N3" is linked to an alternating current-to-direct current converter station "$MMC_1$; $MMC_2$; $MMC_3$" by means of a circuit-breaker-type safety system "$C\_dc_1$: $C\_dc_2$; $C\_dc_3$". Transmission line "Line 12" comprises line circuit breakers "L_dc12; L_dc21", transmission line "Line 13" comprises line circuit breakers "L_dc13; L_dn31", transmission line "Line 23" comprises line circuit breakers "L_dc32; L_dc23". In FIG. 8, reference signs AC1, AC2, AC3 represent alternating current sources and reference signs $ac_1$, $ac_2$, $ac_3$ represent alternating current circuit breakers. At $t_0$=0 a short-circuit type low impedance fault ($R_f$=10 mΩ) is applied to transmission line "Line 12" between line circuit breakers L_dc12 and L_dc21. The fault current associated with the short-circuit fault propagates in the network along transmission lines and reaches the direct side of the converter stations "$MMC_1$; $MMC_2$; $MMC_3$". When the fault is detected by the protection modules (not shown) associated with the circuit breakers, reference signs "$C\_dc_1$; $C\_dc_2$; $C\_dc_3$", these circuit breakers open following receipt of a suitable setpoint. FIG. 9 shows precisely the evolution of the current in pu (per unit), which corresponds to the value of the current divided by the nominal current, as a function of time flowing through each of the safety systems "$C\_dc_1$; $C\_dc_2$; $C\_dc_3$", it can be seen that after 15 ms the converter stations "$MMC_1$; $MMC_2$; $MMC_3$" no longer contribute to the flow of current through the group of transmission lines 2: the safety systems "$C\_dc_1$; $C\_dc_2$; $C\_dc_3$" are therefore open, which corresponds to the first case mentioned above. At the same time, the protection elements (not shown) associated with the line circuit breakers "L_dc12; L_dc21; L_dc13; L_dc32; L_dc23" detect the fault and initiate a process for finding the faulty transmission line. When the process is launched, the current flowing through the transmission lines can exceed the breaking capacity of the line circuit breakers due to an increase in the contributions associated with the discharging of the transmission lines adjacent to the faulty transmission line and with the contributions of the converter stations. When the faulty transmission line is found, i.e. when the elements for protecting the line circuit breakers (in this case L_dc12 and L_dc21) of the same line are aware of the presence of a fault between the line circuit breakers, the current flowing through these line circuit breakers is monitored so that the opening setpoint of said line circuit breakers is sent as soon as the current flowing therethrough drops below the current associated with their breaking capacity, as shown in FIG. 10 (in this case a breaking capacity associated with 2 pu), providing the current (in pu) flowing through the two line circuit breakers L_dc12 and L_dc21 as a function of time: shortly after 15 ms the setpoint for the opening thereof is sent and the fault is isolated ("effective opening" in FIG. 10) shortly before 30 ms, from $t_0$. Thus, restoring the flow of current through the group of transmission lines minus the isolated transmission line can be implemented by closing the safety systems "C_dc$_1$; C_dc$_2$; C_dc$_3$" after 30 ms in this precise case. In this example, no failure occurred in a safety system.

Figure 11:
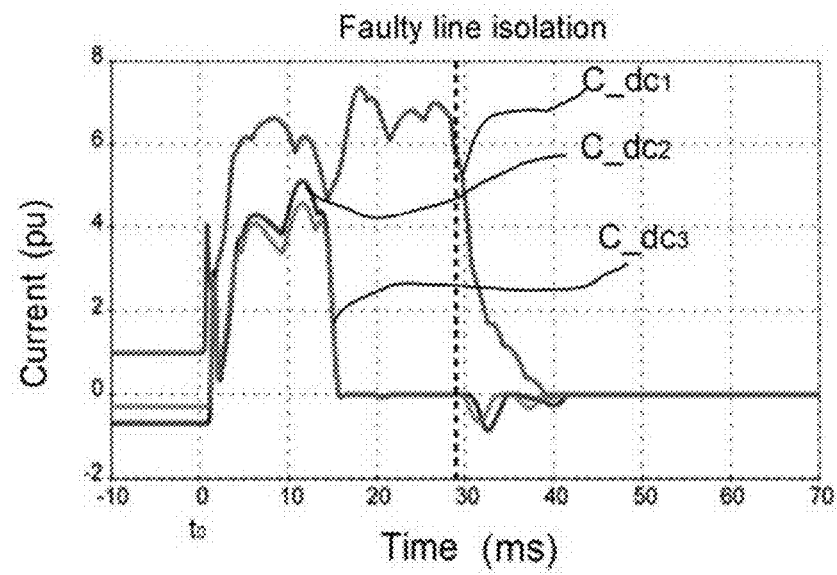
FIG. 11 shows, for a second case, the current on the direct side of the converter stations of FIG. 8 during the time following the occurrence of a short-circuit fault in a transmission line.
Figure 12:
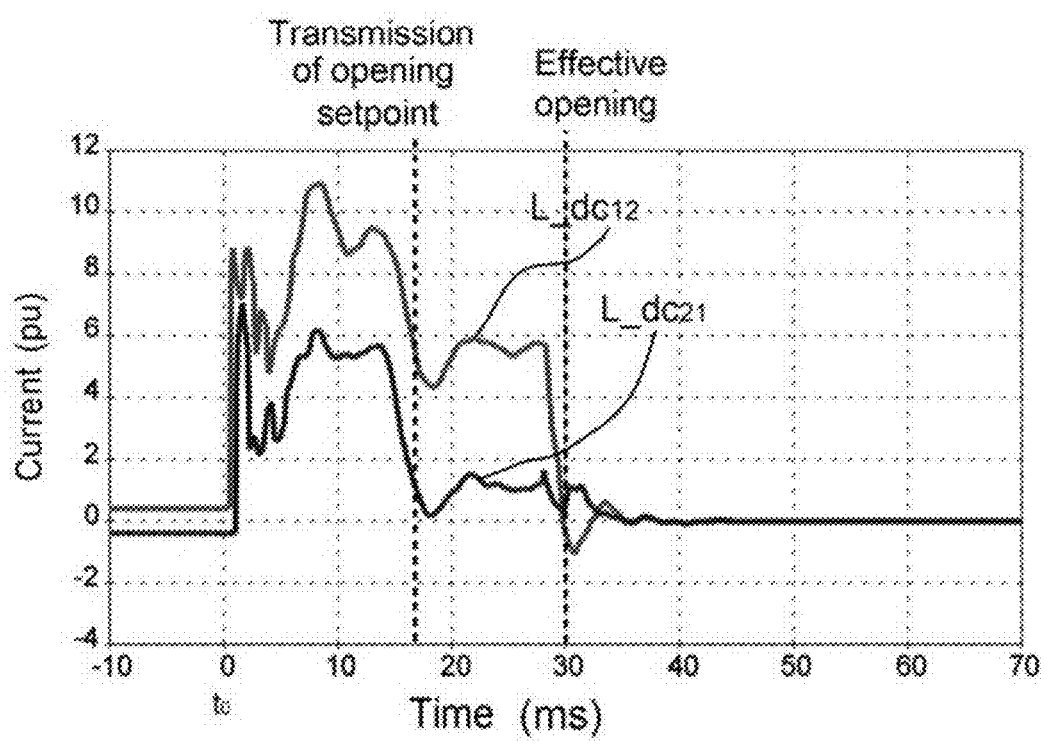
FIG. 12 shows, for the second case, the current flowing through the line circuit breakers of the faulty line of the installation of FIG. 8 during the time following the occurrence of the short-circuit fault.

In a variation corresponding to the second case, the safety system C_dc$_1$ will now be considered to be faulty and not opening even following the detection of the short-circuit fault thereon. Thus, the safety systems C_dc$_2$ and C_dc$_3$ open conventionally, such that only the system C_dc$_1$ continues to supply the group of transmission lines via the source AC1. FIG. 11 shows precisely, the evolution of the current in pu as a function of time on the various safety systems C_dc$_1$, C_dc$_2$ and C_dc$_3$: it can be seen that isolating the transmission line comprising the short-circuit fault at around 30 ms allows the fault current originating from the alternating current source AC1 (FIG. 8) to be cancelled. FIG. 12 shows the evolution of the current (in pu) flowing through the line circuit breakers L_dc12 and L_dc21 throughout this variation, between 10 ms and 20 ms the opening setpoint is sent to the line circuit breakers L_dc12 and L_dc21, the effective opening of which is at 30 ms (FIG. 12), with effective opening at 30 ms resulting in a drop in current in the station MMC$_1$ between 30 ms and 40 ms (FIG. 11). By comparing this variation with the case in which all the safety systems operate and open, the additional time is approximately 10 ms, which is acceptable in the desired application.

According to the particular example and its variation in combination with FIG. 7, the expected durations for implementing the steps of the method are generally as follows:
- from $t_0$ to $t_1$ the expected duration is between 0.2 ms and 2 ms for the fault to be detected on all the safety systems and on all the line circuit breakers;
- from $t_1$ to $t_2$ the expected duration is from 1 ms to 10 ms for the faulty line to be identified;
- from $t_1$ to $t_3$ the expected duration is from 15 ms to 20 ms for the current on the line circuit breakers of the faulty transmission line to drop below the threshold allowing them to be opened;
- from $t_3$ to $t_4$ the expected duration is from 15 ms to 20 ms until the isolation of the faulty line is effective;
- from $t_4$ to $t_5$ the expected duration to restore the power in the network is between 75 ms and 125 ms.

In total, between the occurrence of the fault and the restoration of the network, it takes between 105.2 ms and 167 ms, with these times being considered to be suitable for restoration of the network.

Preferably, the safety systems 7 and the line circuit breakers 5a, 5b all have an identical breaking capacity and all can be mechanical circuit breakers, particularly having a breaking capacity that is equal to 20 kA.

When the safety systems 7 and/or the line circuit breakers 5a, 5b have to switch from an open state to a closed state, this can be implemented by using insertion resistances that are also known as Pre-Insertion Resistances (PIR).

The present invention includes many advantages as previously mentioned, and in particular:
- the capability of the line circuit breakers to open while current is still flowing therethrough allows the sequence for isolating the faulty transmission line to be accelerated without having to wait for the current flowing through the group of lines to be zero;
- in the event of the failure of one of the safety systems, the installation remains robust since the line circuit breakers will still be capable of isolating the faulty transmission line from the group of lines without having to wait for the opening of circuit breakers on the alternating current side, which would increase the time before restoration of power to an unacceptable level;
- the use of mechanical circuit breakers for the line circuit breakers and the safety systems has the advantage of using inexpensive technologies whilst maintaining the robustness of the installation with respect to a short-circuit fault;
- the proposed strategy avoids linking the line circuit breakers to current limiter devices such as inductors linked in series with the line circuit breakers or with other types of current limiters such as, for example, superconducting limiters;
- the use of line circuit breakers allows, if desired, a function to be added to the installation, for example, this allows said line circuit breakers to be used as switches as required by the network manager, in order to isolate a transmission line in the normal operating conditions of the installation, i.e. even when no short-circuit fault is present in the group of lines, with this allowing the network to be reconfigured during the normal operation thereof;
- furthermore, the line circuit breakers can be commanded to open even in the event of a fault with a high fault resistance $R_f$ for which the contribution to the converter fault current is below the limit for detecting faults by the safety systems 7 and the line short-circuit current is below the breaking capacity of the line circuit breakers.

The invention claimed is:

1. A method for controlling an installation (1) for transmitting electricity comprising a direct current transmission network (3) comprising a group (2) of electricity transmission lines (4) linked to one another, each transmission line (4) comprising a pair of two line circuit breakers (5a, 5b) arranged at opposite ends of said transmission line (4), said installation comprising a number N of stations (6) for converting alternating current to direct current each associated with a safety system (7), each converter station (6) being linked to the group (2) of transmission lines (4) and being associated with a maximum contribution of short-circuit current, each safety system (7) is capable of interrupting a direct current corresponding to the maximum contribution of short-circuit current of an associated converter station (6), the line circuit breakers (5a, 5b) each having a breaking capacity capable of interrupting a direct current corresponding to a highest of the maximum contributions of short-circuit current of the converter stations (6), the method comprises, following an occurrence of a short-circuit fault on one of the transmission lines (4), the following steps of:
   opening at least N-1 safety systems (7) such that, for each safety system (7) that is opened, a contribution to the flow of current through the group (2) of transmission lines (4) originating from the converter station (6) associated with said safety system (7) that is opened is removed;
   finding the short-circuit fault to identify a faulty transmission line (4); and
   implementing after identification of the faulty transmission line (4) by the finding step (E2), of isolating the faulty transmission line (4) by opening line circuit breakers (5a, 5b) of said faulty transmission line (4).

2. The method as claimed in claim 1, further comprises a step (E5) of detecting the short-circuit fault on each safety system (7) triggering, for each safety system (7) and after the short-circuit fault has been detected on said safety system (7), a step (E6) of transmitting an opening command signal to said safety system (7).

3. The method as claimed in claim 1, further comprises a step (E9) of detecting the short-circuit fault on each line circuit breaker (5a, 5b), and finding step (E2) comprises, for each pair of line circuit breakers (5a, 5b) of a same transmission line (4) and after the short-circuit fault has been detected on the line circuit breakers (5a, 5b) of said pair;
    a step (E2-1) of checking for presence of the short-circuit fault between said line circuit breakers (5a, 5b) of said pair, and
    the step (E3) of isolating the faulty transmission line (4) being implemented only after the presence of the short-circuit fault has been detected on said faulty transmission line (4) by checking step (E2-1).

4. The method as claimed in claim 1, wherein the step (E3) of isolating the faulty transmission line (4) comprises a step (E3-1) of monitoring at least one physical feature on each of the two line circuit breakers (5a, 5b) of said faulty transmission line (4), each of said two line circuit breakers (5a, 5b) opening, independently of one another, as soon as the at least one physical feature monitored in a vicinity thereof is located below a reference threshold.

5. The method as claimed in claim 1, wherein only N-1 safety systems (7) open following the occurrence of the short-circuit fault, with a safety system (7) that remains closed being considered to be in a faulty state.

6. The method as claimed in claim 1, further comprises a step (E7) of detecting a failure of the safety system (7) in a faulty state, then a step (E8) of disconnecting an electrical connection between a converter station (6), associated with said safety system (7) in the faulty state, and a group (2) of transmission lines (4).

7. The method as claimed in claim 1, wherein the isolation step (E3) is such that opening at least one of the two line circuit breakers (5a, 5b) is implemented while current is still flowing therethrough.

8. The method as claimed in claim 1, wherein each safety system (7) is selected from: a safety system (7) integrated in the converter station (6) and an independent circuit breaker arranged on an electrical link linking the converter station (6), associated with said safety system (7), with said group (2) of transmission lines (4).

9. The method as claimed in claim 1, further comprises a step (E4) of restoring the direct current transmission network that is implemented after the step (E3) of isolating the faulty transmission line (4), said restoration step (E4) comprising closing each safety system (7) that is opened during the opening step (E1), during and following the restoration step (E4) the line circuit breakers (5a, 5b) of said faulty transmission line (4) remain open so that the short-circuit fault of said faulty transmission line (4) is electrically isolated from the other transmission lines (4) of the group (2).

10. An installation for transmitting electricity comprising:
    a direct current transmission network (3) comprising a group (2) of electricity transmission lines (4) linked to one another, each electricity transmission line (4) comprising a pair of two line circuit breakers (5a, 5b) arranged at the opposite ends of said electricity transmission line (4);
    a number N of stations (6) for converting alternating current to direct current each associated with a safety system (7), each converter station (6) being linked to the group (2) of transmission lines (4) and being associated with a maximum contribution of short-circuit current;
    each safety system (7) is capable of interrupting a direct current corresponding to the maximum contribution of short-circuit current of an associated converter station (6);
    the line circuit breakers (5a, 5b) each have a breaking capacity capable of interrupting a direct current corresponding to a highest of the maximum contributions of short-circuit current of the converter stations (6);
    the installation is configured to send an opening signal to each safety system (7) when a short-circuit fault originating from the group (2) of electricity transmission lines (4) is detected on said safety system (7); and
    the installation is configured, for each pair of line circuit breakers (5a, 5b), to send an opening signal to the line circuit breakers (5a, 5b) of said pair when the short-circuit fault is detected on the line circuit breakers (5a, 5b) of said pair and when said short-circuit fault is located between the line circuit breakers (5a, 5b) of said pair.

11. The installation as claimed in claim 10, wherein the installation is implemented by software and hardware.

12. The method as claimed in claim 1, wherein the method is implemented by software and hardware.

* * * * *